United States Patent [19]

Bird et al.

[11] Patent Number: 5,224,098

[45] Date of Patent: Jun. 29, 1993

[54] COMPENSATION FOR MISMATCHED TRANSPORT PROTOCOLS IN A DATA COMMUNICATIONS NETWORK

[75] Inventors: Raymond F. Bird, Durham; Kathryn H. Britton, Chapel Hill; Tein-Yaw D. Chung, Cary; Allan K. Edwards, Raleigh; Johny Mathew; Diane P. Pozefsky, both of Chapel Hill; Soumitra Sarkar, Durham; Roger D. Turner; Winston W. Chung, both of Cary, all of N.C.; Yue T. Yeung, Austin, Tex.; James P. Gray, Chapel Hill, N.C.; Harold D. Dykeman, Rueschlikon; Willibald A. Doeringer, Langnau, both of Switzerland; Joshua S. Auerbach, Ridgefield, Conn.; John H. Wilson, Austin, Tex.

[73] Assignee: International Business Machines Corporation, Armonk, N.Y.

[21] Appl. No.: 731,564

[22] Filed: Jul. 17, 1991

[51] Int. Cl.$^5$ .............................................. G06F 13/00
[52] U.S. Cl. ................................. 370/94.1; 370/110.1; 395/200; 395/325; 395/800
[58] Field of Search ..................... 370/24, 32, 60, 85.1, 370/85.2, 85.4, 85.6, 85.13, 94.1, 94.3, 110.1; 340/825.5, 825.51; 395/200, 325, 725, 775, 800

[56] References Cited

U.S. PATENT DOCUMENTS

| 4,941,089 | 7/1990 | Fischer | 370/85.13 |
| 4,991,133 | 2/1991 | Davis et al. | 370/94.1 |
| 5,056,058 | 10/1991 | Hirata et al. | 370/94.1 |
| 5,115,432 | 5/1992 | Haas | 370/94.1 |

OTHER PUBLICATIONS

X/Open Portability Guide, X/Open Company Limited, published by Prentice Hall, Englewood Cliffs, N.J., 1988, pages.
"Protocol Conversion" by Paul E. Green, Jr., IEEE Transactions on Communications, vol. COM-34, No. 3, Mar. 1986, pp. 257–268.
"TACT: A Protocol Conversion Toolkit" by Joshua Auerbach, IEEE Journal on Selected Areas in Communications, vol. 8, No. 1, Jan. 1990, pages 143–159.
"Transition and Coexistence Strategies for TCP/IP to OSI" by Marshall T. Rose, IEEE Journal on Selected Areas in Communications, vol. 8, No. 1, Jan. 1990, pp. 57–66.
"Conversion Between the TCP and ISO Transport Protocols as a Method of Achieving Interoperability Between Data Communications Systems" by Inge Groenbaek, IEEE Journal on Selected Areas in Communications, vol. SAC-4, No. 2, Mar. 1986, pp. 288–296.
"Design Principles for Communication Gateways" by Gregor V. Bochmann and Pierre Mondain-Monval, IEEE Journal on Selected Areas in Communications, vol. 8, No. 1, Jan. 1990, pp. 12–21.

(List continued on next page.)

*Primary Examiner*—Douglas W. Olms
*Assistant Examiner*—Alpus H. Hsu
*Attorney, Agent, or Firm*—Gerald R. Woods

[57] ABSTRACT

A Transport Layer Protocol Boundary (TLPB) architecture is described which will permit an application program to run over a non-native transport protocol without first generating a protocol compensation package tailored to the transport protocols assumed by the program's application programming interface and by the available transport provider. All transport functions required by the program are converted to standardized or TLPB representations. When a connection between the first application program and a second remote application is requested, the individual required TLPB transport functions are compared to corresponding functions supported by the transport provider. Compensations are invoked only where there is a mismatch. The node on which the remote application program runs is informed of the compensations so that necessary de-compensation operations can be performed before the data is delivered to the remote application program.

12 Claims, 12 Drawing Sheets

OTHER PUBLICATIONS

"Network Interconnection and Gateways" by Carl A. Sunshine, IEEE Journal on Selected Areas in Communications, vol. 8, No. 1, Jan. 1990, pp. 4–11.

"Protocol Standard for a NetBIOS Service on a TCP/UDP Transport: Concepts and Methods", Defense Advanced Research Projects Agency, Internet Activities Board, End-to-End Services Task Force, NetBIOS Working Group, RFC 1001, Mar. 1987.

"ISO Transport Services on Top of the TCP: Version 3" by M. T. Rose and D. E. Cass, RFC 1006, May 1987.

"Protocol Standard for a NetBIOS Service on A TCP/UDP Transport: Detailed Specification", RFC 1002, Mar. 1987.

Unix Programmers Manual Reference Guide, Computer Science Division, Dept. of Electrical Engineering and Computer Science, University of California at Berkley, Apr. 1986.

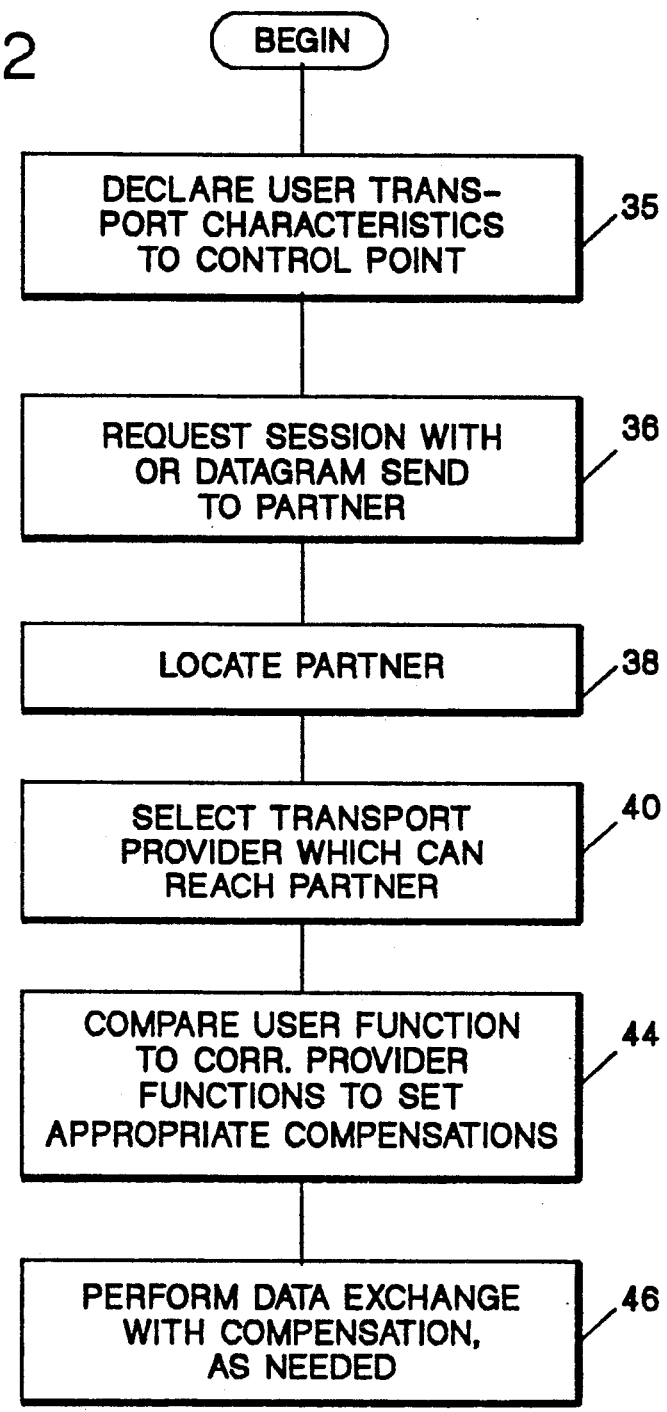

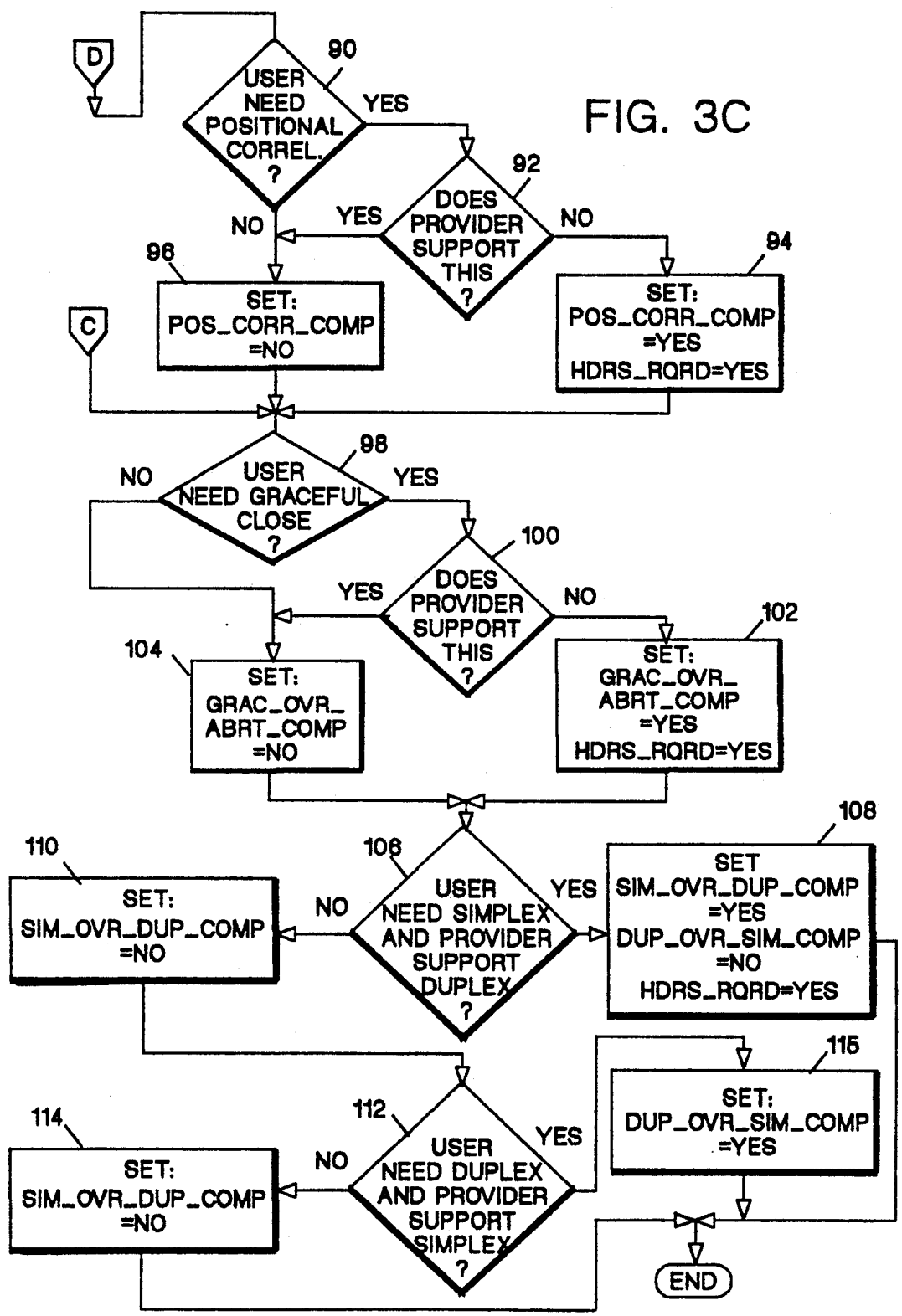

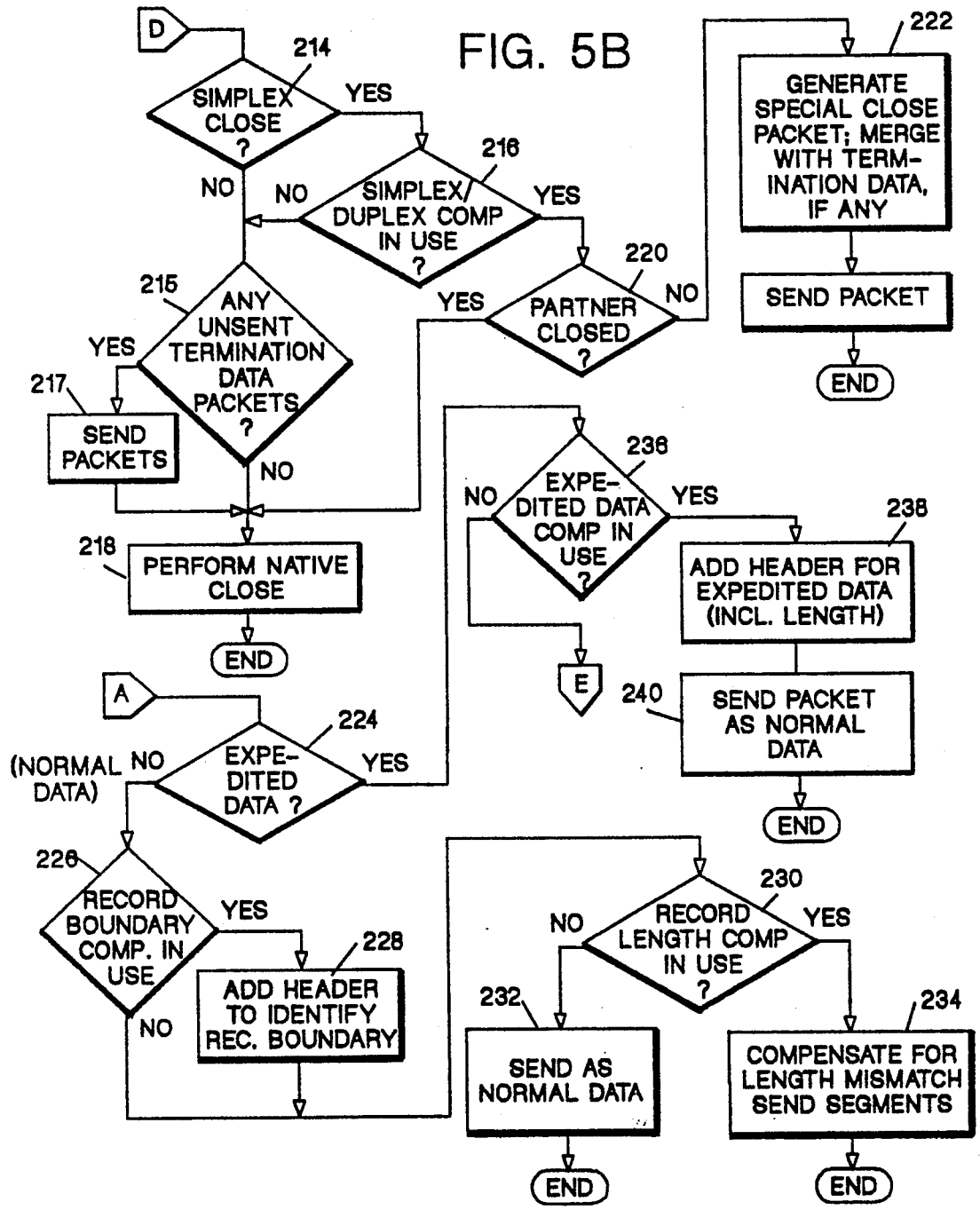

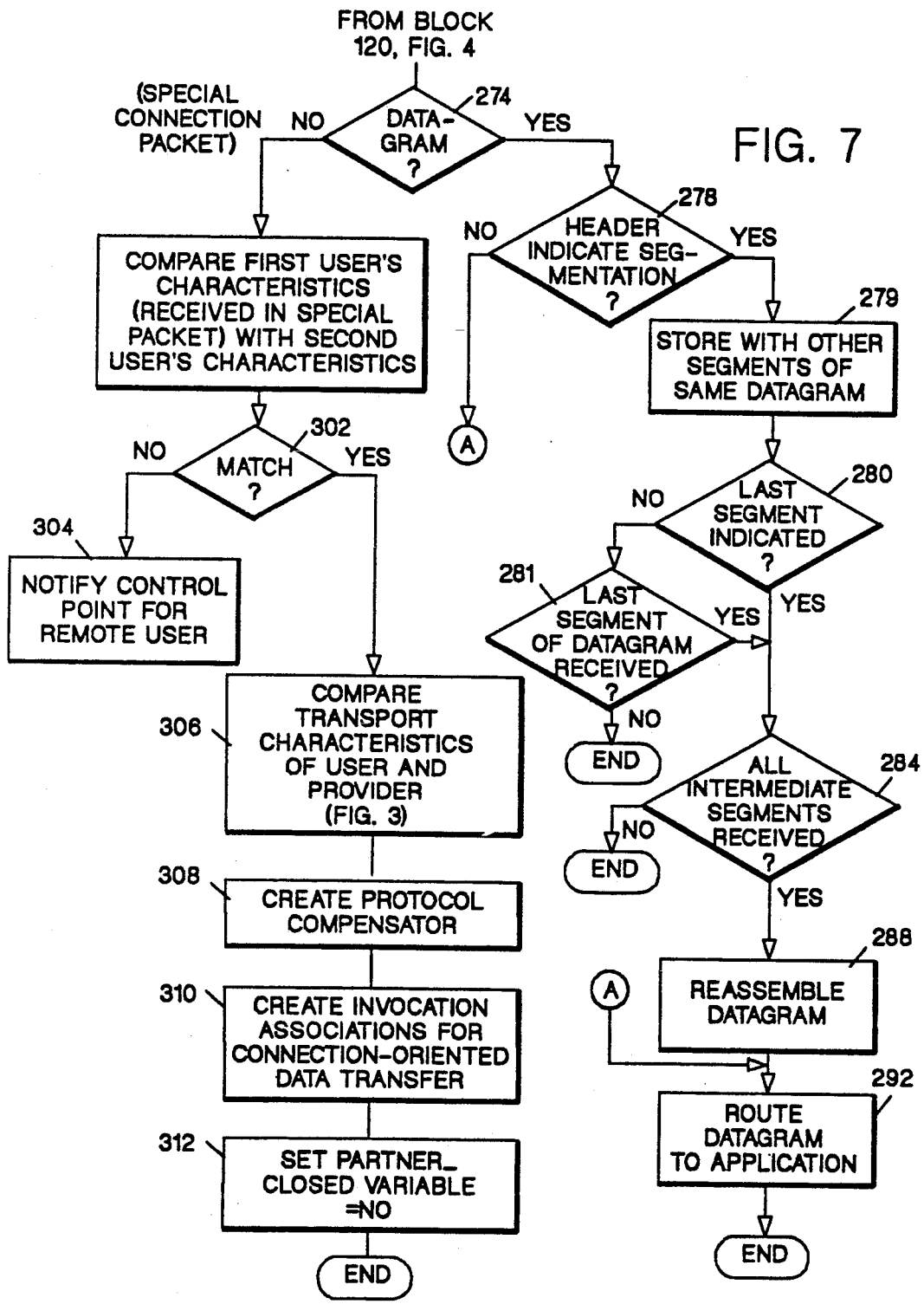

COMPENSATION FOR MISMATCHED TRANSPORT PROTOCOLS IN A DATA COMMUNICATIONS NETWORK

FIELD OF THE INVENTION

The present invention relates to data communications networks and more particularly to techniques for enabling application programs to communicate through such networks notwithstanding differences in the transport protocols assumed by the programs and the transport protocols actually implemented in the network.

BACKGROUND OF THE INVENTION

In the early days of computers, virtually all computer systems consisted of stand-alone host processors to which peripheral devices (such as terminals, printers, disk drives, and the like) were connected, either directly or remotely through device controllers. Each host processor operated substantially independently and communications between different host processors were minimal.

It was recognized even then that computer users can benefit greatly by connecting host processors in networks. Such networks permit one or more users in different locations to send data to a single host processor. The single host processor can merge and process the data. The host processor can pass the data on to still other host processors or can use it in reports to be electronically distributed to users at locations remote from the host processor. Such networks also support company-wide electronic mail systems or even distributed processing operations in which host processors at different locations work together to execute what an outside observer would view as a single computer program.

Different suppliers of computer hardware and software developed different ideas of the formats and protocols that should be following in transporting data through networks. For example, some have developed protocols under which expedited data can be sent by bypassing normal data flow controls. Other protocols don't support expedited data flows. Different protocols also exist for such transport tasks as establishing and terminating connections between host processors.

Examples of well known communication protocols include System Network Architecture (SNA), Digital Network Architecture (DECnet), Transmission Control Protocol/Internet Protocol (TCP/IP), NetBIOS, OSI. Other communication protocols exist and are widely used.

The data to be transported through a network is, of course, generated by a computer program which is being executed on a host. Such computer programs are called application programs to distinguish them from system programs, which are used to control the internal operations of the host processor.

Most application programs are written to an application programming interface or API which assumes a specific communication protocol.

As networks have grown, and particularly as local area networks have come into widespread use, many organizations have ended up with confederations of individual networks running different networking protocols. This heterogeneity has arisen for a number of reasons. Organizations with different kinds of networks may merge or one may be acquired by another. Individual departments within a single organization may acquire their own hardware and software and create their own local networks without regard to what other departments in the same organization may be doing.

It has become commonplace for a single organization to have dozens of networks running as many as four or five different networking protocols, including those identified above and others.

If a mismatch exists between the transport protocols assumed by an API for a company's application program and the transport protocols actually implemented in one or more of the networks on which the organization would like to transport the application data, effective use of the program is hindered.

The problems caused by transport "protocol mismatches" are likely to get worse as more and more organizations begin to communicate with each other through their computer networks to perform functions such as order processing or direct billing or to carry out cross-organization activities such as implementation of joint ventures or conduct of standards activities.

An organization needs the capability of writing an application once and having it run on different networks and being able to communicate with matching applications through heterogeneous networks.

In the absence of this capability, an organization has two choices. One choice is to rewrite the applications so they can run over a different transport protocol.

The other choice is to build application gateways to allow different applications with similar functions to communicate. For example, there exist application gateways to allow an electronic mail application associated with SNA to communicate with a similar application associated with OSI.

The main drawback to this approach is that each application gateway handles only one specific application. If an organization has N different networks, it would have to have $N(N-1)/2$ application gateways to achieve complete interoperability among programs running on the different networks. The cost of having programmers write all of the necessary application gateways makes the approach economically unattractive.

The capability to write an application once and have it run on different networks exists only partially today. Programs written to particular API's today may run across more than one type of network. For example, programs written to a NetBEUI (NetBIOS End User Interface) can run across either NetBIOS or IPX network protocols. Similarly, programs written to a XTI interface can run on TCP/IP or OSI networks. Even where an API allows access to multiple protocols, the programmer must be aware of the protocols that will be used when writing the program.

While better than nothing, this degree of flexibility is considered inadequate by many organizations, who would like to be able to choose application programs based solely on the functions they perform, not on the protocols they use.

SUMMARY OF THE INVENTION

The present invention is a general solution to the problem of compensating for differences between the transport protocols assumed by an application and the transport protocols that are actually implemented in a network over which the application is to communicate with other applications.

The invention may be embodied in a method of establishing a transport-layer connection between a first transport user at one node in a computer network and a second transport user at a different node in the network. According to the method, a first set of transport functions is established representing the transport functions required by the first transport user. A second set of transport functions is established, consisting of the transport functions supported by a transport provider. Corresponding functions in the two sets are compared to see if they match. Where a mismatch occurs, data being transferred between the two transport users is altered to compensate for any such mismatch.

BRIEF DESCRIPTION OF THE DRAWINGS

While the specification concludes with claims which particularly point out and distinctly claim that which is regarded as the present invention, further details of a preferred embodiment of the invention may be more readily ascertained from the following detailed description, when read in conjunction with the accompanying drawings wherein:

FIG. 2 is a high level flow chart of functions performed at each of the nodes;

FIG. 7 is a flow chart of the specific steps that must be performed when receiving data representing a datagram or a special connection packet.

DETAILED DESCRIPTION

Figure 1:
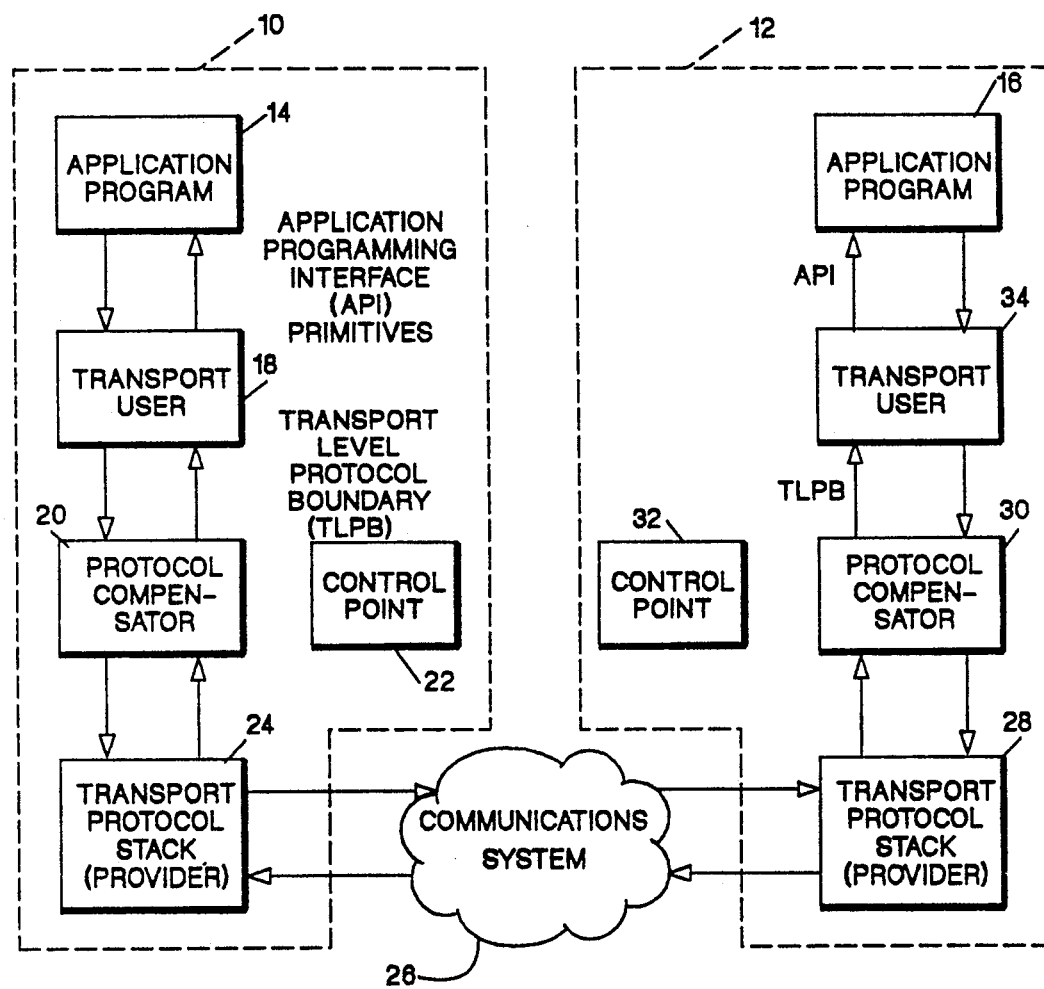
FIG. 1 is a block diagram of a two node computer network, showing functional representations of major elements of the present invention.

FIG. 1 is a high-level block diagram of a simple computer network consisting of a first node 10, a second node 12 and an intervening communications system 26 through which an application program 14 in node 10 may exchange data with an application program 16 in node 12.

Referring first to node 10, the application program 14 communicates with the remainder of the network by sending and receiving commands and data, frequently referred to as primitives. The primitives are provided by the application programming interface or API that was employed in writing the application program.

The primitives flow to and from a transport user 18, the role of which is to convert application primitives to standard representations referred to as transport layer protocol boundary (TLPB) functions. The TLPB contains verbs which perform major transport functions such as opening connections, sending and receiving data and closing connections. Most application programs will need only a limited set of TLPB functions. If an application program is written directly to the TLPB, the transport user function would be integrated into the application program.

Transport user 18 may be logically linked to a protocol compensator 20. Both the user and the protocol compensator (where one exists) will operate under the control of a control point 22 in node 10. Protocol compensator 20 is tied to the communication system 26 through a transport protocol stack or transport provider 24.

Transport provider 24 defines the transport protocols that are actually implemented when data is exchanged between the two nodes over the communication system 26. Examples of transport providers are layers 1-4 of OSI or SNA, NETBIOS, TCP/IP and others mentioned earlier.

One basic function of the protocol compensator 20 is to intercept TLPB verbs provided by the transport user and, where appropriate, to add information to the data stream to compensate for any mismatch between the protocol followed by a TLPB verb and the protocol followed by a corresponding verb or function in transport provider 24. Another basic function is to accept data from the provider 24 and to modify the data stream to provide compensations needed to convert the data stream to TLPB representations. More details as to the operation of the protocol compensator are provided later.

Node 12 contains its own transport user 34, protocol compensator 30, control point 32 and transport provider 28. These components perform the same basic functions as the corresponding components in node 10.

The operation of each protocol compensator relies on the fact that, while transport providers differ from one another, all perform certain characteristic functions and the functions differ from one another in readily characterized ways. Salient characteristics of various transport functions and the types of compensations generally required are discussed below. Details of compensation provided for particular situations are provided in the discussion of certain figures.

Connection data: Some application programs require that connection data be sent to a partner program before the connection is set up or opened. Some transport protocols don't allow such data to be sent. If a transport user requires connection data, but the available transport provider doesn't support the sending of connection data, compensation must be provided to permit such data to be conveyed through the system.

Termination data: Some application programs require that termination data be sent before a connection is broken or closed. If the available transport protocol doesn't support the sending of such data, the data stream provided by the user must be modified to permit termination data to flow through the system. The type of modification or compensation depends on the termination details. These are discussed later.

Record boundaries: Some users need to preserve record boundaries when transmitting data. Some providers support only unbounded data streams. Compensation is required if the transport user is record-oriented but the transport provider is stream-oriented. Compensation is also required if the user is stream-oriented but the provider is record-oriented.

Expedited data: Some users require that data be characterized either as normal data or expedited data with higher transport priority being given to expedited data. If a user requires an expedited data function and the provider fails to support that function, compensation is required to permit priority transport of expedited data.

Correlation of expedited and normal data: Some protocols which support the transport of expedited data also maintain information about the position of the last byte of normal data that was sent before the expedited data flow began. This permits normal data flow to be resumed when expedited data has been received. If the user requires positional correlation but the provider doesn't support it, compensation is required to permit the function to be performed.

Maximum length of expedited data: Different protocols allow different amounts of expedited data to be sent at one time. If the transport user needs to send more bytes of expedited data at one time than the transport provider allows, compensation is required.

Maximum length of connectionless data: Different protocols permit unicast or multicast datagrams of different sizes. If the user wants to send a datagram that is longer than the maximum size supported by the provider, compensation is the form of segmentarion and reassembly of the user datagram must be provided.

Maximum record size: The maximum size of a record varies across different protocols. If the provider supports a shorter record than that required by the user, compensation in the form of segmentation and reassembly is required.

Graceful or abortive close: "Graceful close" protocols are those which require (1) that a provider who is closing a connection make a best effort to send any data pending in its internal buffers before executing the close, and (2) that a provider who has been receiving data make a best effort to pass data to its transport user before executing the close. Protocols which don't attempt this are referred to as "abortive close" protocols.

If a transport user requires a graceful close but the transport provider supports only abortive close, compensation is required. If the transport user requires abortive close and the transport provider supports graceful close, no compensation is required.

Simplex or duplex close: Some protocols allow only one end of a full duplex connection to be closed by the protocol user. This type of termination is referred to as simplex close. Other protocols permit both ends of a duplex connection to be closed by either end. This is referred to as duplex close. If the transport user requires simplex close and the transport provider supports only duplex close, one type of compensation is needed. If the transport user requires duplex close and the transport provider supports only simplex close, another type of compensation is required. The specific compensations are described in detail later.

The process by which compensations of the type generally described above are invoked is described at a high level in flow chart form in FIG. 2. Details of the manner in which the compensations are implemented will be described with reference to later figures.

The initial step 35 in the process requires that the transport user inform the control point of the characteristics of the transport functions which it may require.

Necessary compensations must be established whether the an application program wishes (1) to set up a session between itself and a second application program located at another node or (2) to send a datagram to a partner in a "connectionless" mode of operation. The first application must issue one of these two requests (operation 36) and the second or partner program must be located (operation 38). There may be more than one transport provider available to the first application program. One of the available transport providers is selected in an operation 40. The primary criteria for the provider selection process is the ability of the provider to reach the partner application program.

When the transport provider has been selected, the transport functions required by the transport user are compared to corresponding transport functions in the selected transport provider in an operation 44 to determine whether there are any differences or mismatches in the protocols assumed by the transport user and those supported by the selected transport provider. For example, a requirement that the application program provide connection data to the partner program is compared against the transport provider's ability to send such connection data.

The compensation requirements which are established by this comparison process are employed in the protocol compensator layer of the system previously described with reference to FIG. 1.

The compensation requirements are communicated to the control point for the second node as the protocol compensator at the second node must know how to "decompensate" for any compensation made at the first node.

Most of the compensation functions are performed by adding special headers to the data stream. The exceptions to this are compensations required for sending connection data and for performing duplex-over-simplex or stream-over-record close. The details of both ordinary and extraordinary types of compensation are provided later.

When it is determined that a compensation requires special headers for data, special headers are added to every packet in the data stream even if the data in a particular packet does not require compensation. This is necessary so that the compensator in the partner node can distinguish headers from data.

Figure 3A:
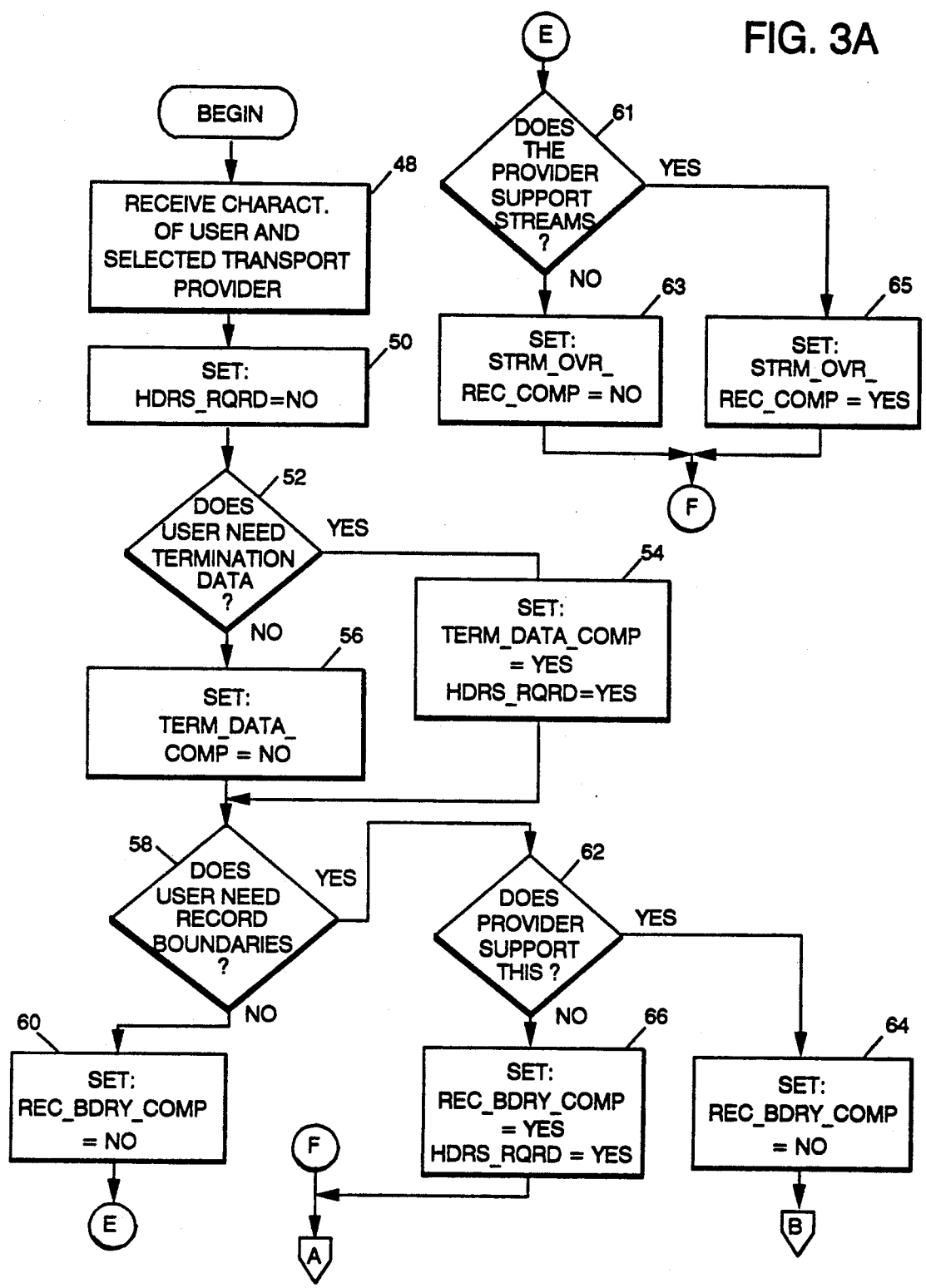
FIG. 3, consisting of FIGS. 3A, 3B and 3C taken together, is a flow chart of operations that are performed in determining the protocol compensations that are required when an application program is to be run over a particular network.
Figure 3B:
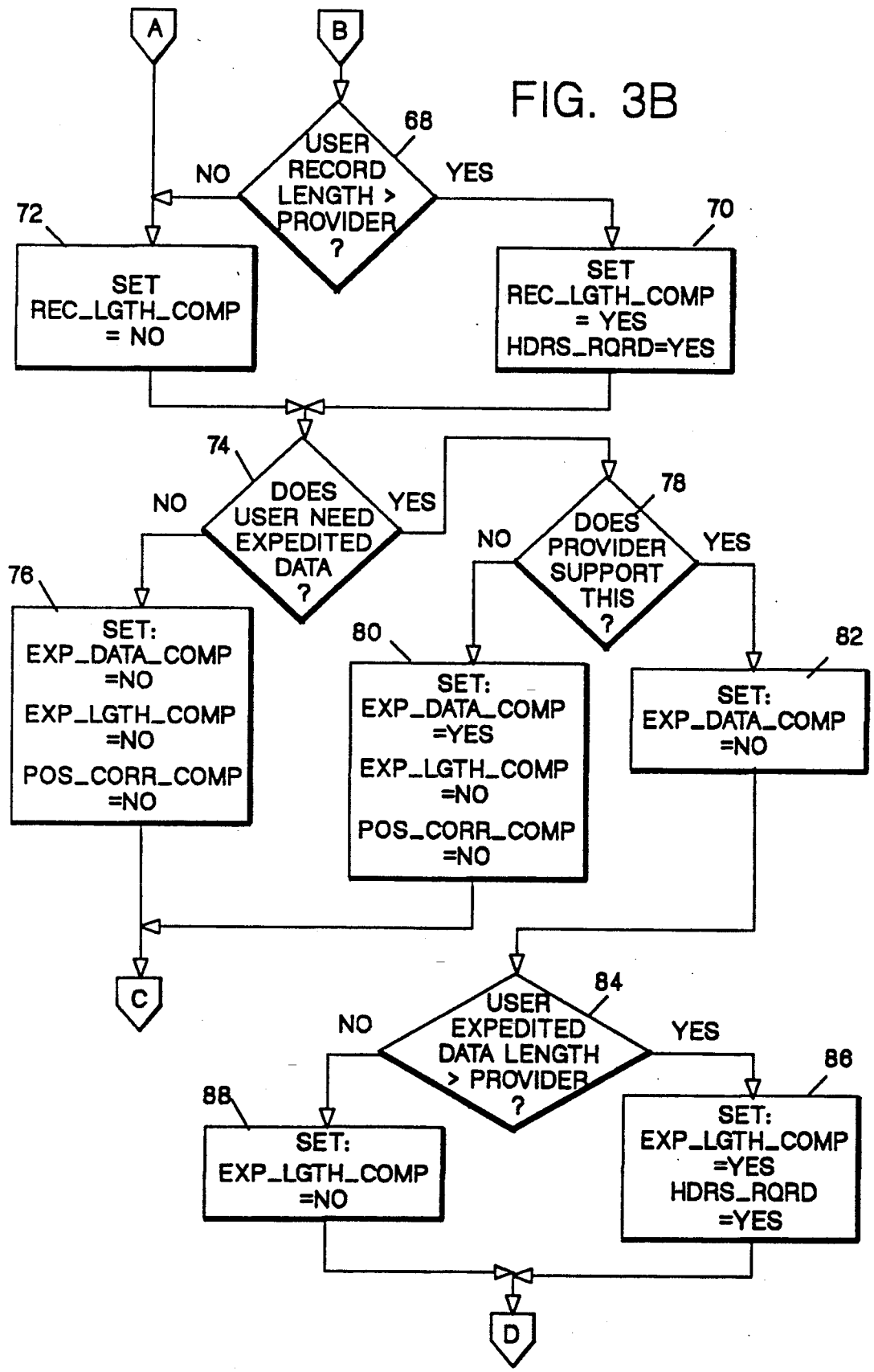

FIG. 3 is a detailed flow chart of the process for determining exactly what compensations are needed for a given application program and a given transport provider. The control point for the node must receive the transport characteristics of both the transport user and the selected transport provider in an operation 48. A HDRS.RQRD variable is initialized to No in operation 50.

A check 52 is then made as to whether the transport user requires termination data be sent to the partner user before any connection is closed. If this requirement exists, a TERM_DATA_COMP variable is set to Yes, as is the HDRS_RQRD variable. If the user does not require the sending of termination data, the TERM_DATA_COMP variable is set to No.

The next check (58) is whether the transport user must preserve record boundaries when sending data. If this requirement exists, a check 62 is made to determine if the provider supports preservation of record boundaries. If the provider performs the necessary support a REC_BDRY_COMP variable is set to No in operation 64. If the provider doesn't provide the necessary support, the REC_BDRY_COMP variable is set to Yes, along with the HDRS_RQRD variable, in an operation 66.

If check 58 initially shows that the user doesn't require preservation of record boundaries, the REC_BDRY_COMP variable is set to No in operation 60. A check 61 must then be made as to whether the provider supports stream operation. If the provider does support stream operation, a STRM_OVR_REC_COMP variable is set to Yes in operation 65. Otherwise, the same variable is set to No in an operation 63.

If both the user and the provider support preservation of record boundaries, an operation 68 is needed to compare the maximum record length required by the user and the maximum record length supported by the provider. If the record length required by the user is greater, a REC_LGTH_COMP variable (and the HDRS_RQRD variable) are both set to Yes in an operation 70.

If, however, the user doesn't care about preservation of record boundaries or if the provider fails to provide support for preservation of record boundaries or the provider does support preservation of record boundaries and a record length at least as great as that required by the user, the REC_LGTH_COMP variable is set to No in operation 72.

A check 74 is then made as to whether the user requires that the data stream consist of normal and expedited data. If the user has no requirement for expedited data, several variables (EXP_DATA_COMP, EXP_LGTH_COMP and POS_CORR_COMP) are all set to No in an operation 76. The setting of the EXP_DATA_COMP variable determines whether compensation is required to support sending of such data. The meaning of the other variables is explained below.

If the user requires expedited data, a check 78 is made to determine whether the provider supports it. If the provider does offer such support, no compensation is needed and the EXP_DATA_COMP variable is set to No in an operation 82.

If the user has a requirement for expedited data but check 78 indicates that the provider fails to support it, then EXP_DATA_COMP is set to Yes in an operation 80 while POS_CORR_COMP and EXP_LGTH_COMP are set to No. Expedited length compensation is not required since the header used for expedited data includes the length of the data and the position is easily inferred.

If the provider offers the needed support, then a check 84 must be made to determine whether the provider supports the sending of expedited data packets which are at least as long as those required by the user. If the provider fails to support sufficiently long packets of expedited data, both the EXP_LGTH_COMP variable and the HDRS_RQRD variable are set to yes in an operation 86.

If the provider expedited packets are long enough to meet the user's requirements, the EXP_LGTH_COMP variable is set to No in an operation 88.

If the user needs and the provider supports the sending of expedited data, a check 90 must be also made to see if the user requires that positional correlation data be sent to allow the partner program to track normal data that was interrupted when the expedited data was sent.

Assuming the user has this requirement, a check 92 determines whether the provider also supports it. If the necessary provider support does not exist, a POS_CORR_COMP variable is set to Yes in operation 94.

The HDRS_RQRD variable is set to Yes in the same operation.

If the user does not require positional correlation or if both the user and provider support it, the POS_CORR_COMP can be set to No in an operation 96.

The next step (operation 98) in the process is to determine whether the user requires a graceful close of a connection. If the user requires a graceful close, but an operation 100 indicates the provider doesn't support such a close, both a GRAC_OVR_ABRT and the HDRS_RQRD variable are set to Yes in an operation 102.

If the user doesn't require a graceful close or if the provider supports the user's need for such a close, the GRAC_OVR_ABRT_COMP variable is set to No in operation 104.

Finally, it must be determined whether compensation must be provided for situations where a provider may or may not assume a simplex close or a duplex close assumed by the user. An operation 106 checks whether the user assumes a simplex close will be performed and whether the provider supports only duplex close operations. If the described situation is found to exist, a SIM_OVR_DUP_COMP variable and the HDRS_RQRD variable are set to Yes in an operation 108. Concurrently, a DUP_OVR_SIM_COMP variable is set to No.

If check 106 shows a user isn't expecting a simplex close where the provider supports only duplex closes, the SIM_OVR_DUP_COMP variable is set to No in an operation 110.

Since operation 106 checks for only one of two possible simplex/duplex close protocol mismatches, an operation 112 is needed to determine whether the user assumes a duplex close while the provider supports only simplex closes. If that situation exists, the DUP_OVR_SIM_COMP variable must be set to Yes in operation 115. Otherwise, the same variable is set to No in operation 114.

If operation 114 is invoked, that means that both of the compensation variables (DUP_OVR_SIM_COMP and SIM_OVR_DUP_COMP) will have negatives values. That indicates no protocol mismatch exists and the both the user and the provider are assuming either a simplex close or a duplex close.

At the conclusion of the process shown in FIG. 3 and described above, the below listed variables will be set to either Yes or No values to define exactly what compensations must be provided for the given transport user and the given transport provider.

| HDRS_RQRD | TERM_DATA_COMP | REC_BDRY_COMP |
| REC_LGTH_COMP | EXP_DATA_COMP | EXP_LGTH_COMP |
| POS_CORR_COMP | GRAC_OVR_ABRT_COMP | SIM_OVR_DUP_COMP |
| DUP_OVR_SIM_COMP. | STRM_OVR_REC_COMP | |

The set of compensations which must be provided define a protocol compensator capable of permitting an application program to run over a transport having protocols different from the protocols which were assumed when the program was written.

Figure 4A:
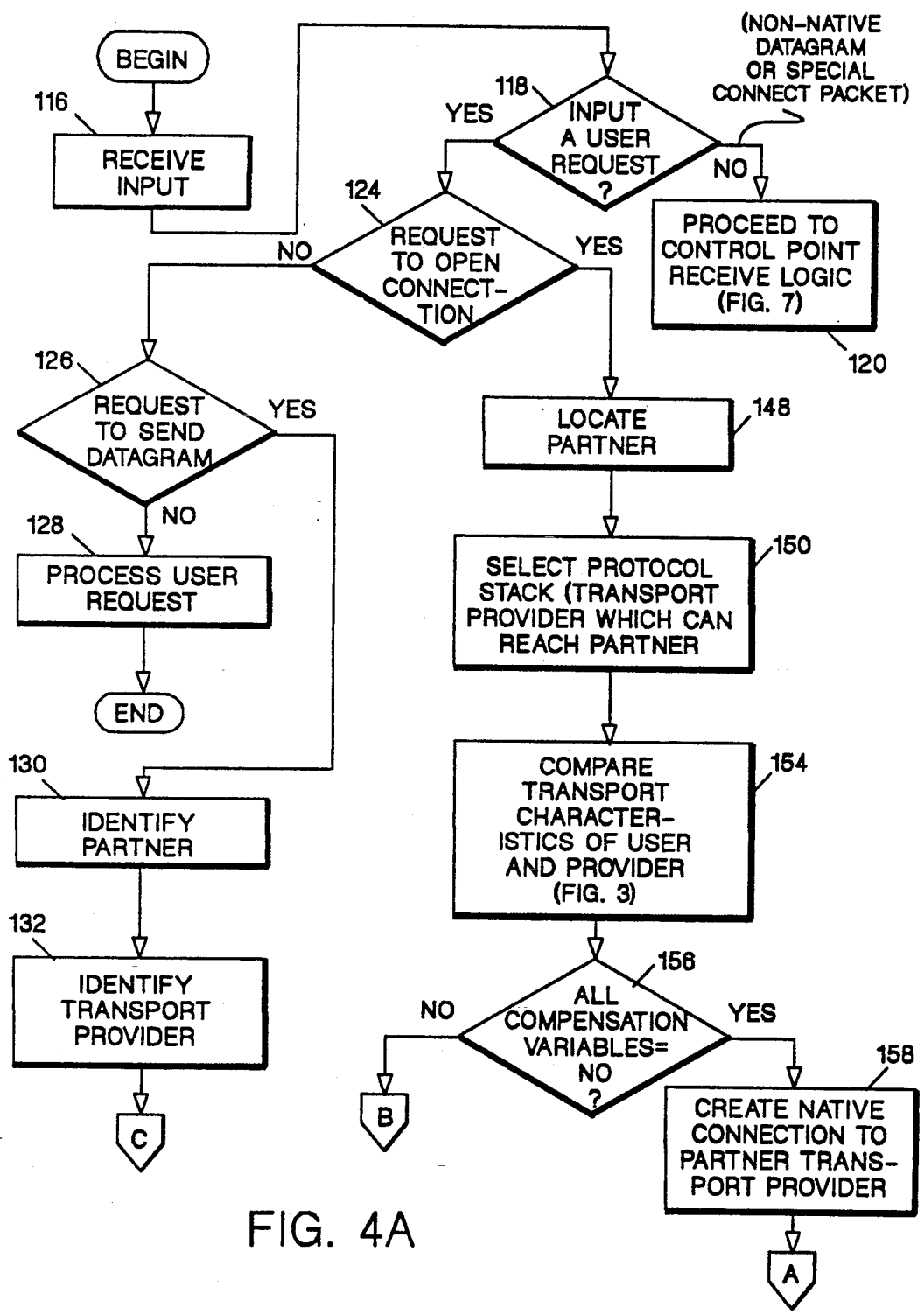
FIG. 4, consisting of FIGS. 4A, 4B and 4C taken together, is a general flow chart of the compensation process that occurs, when the application program is run.
Figure 4B:
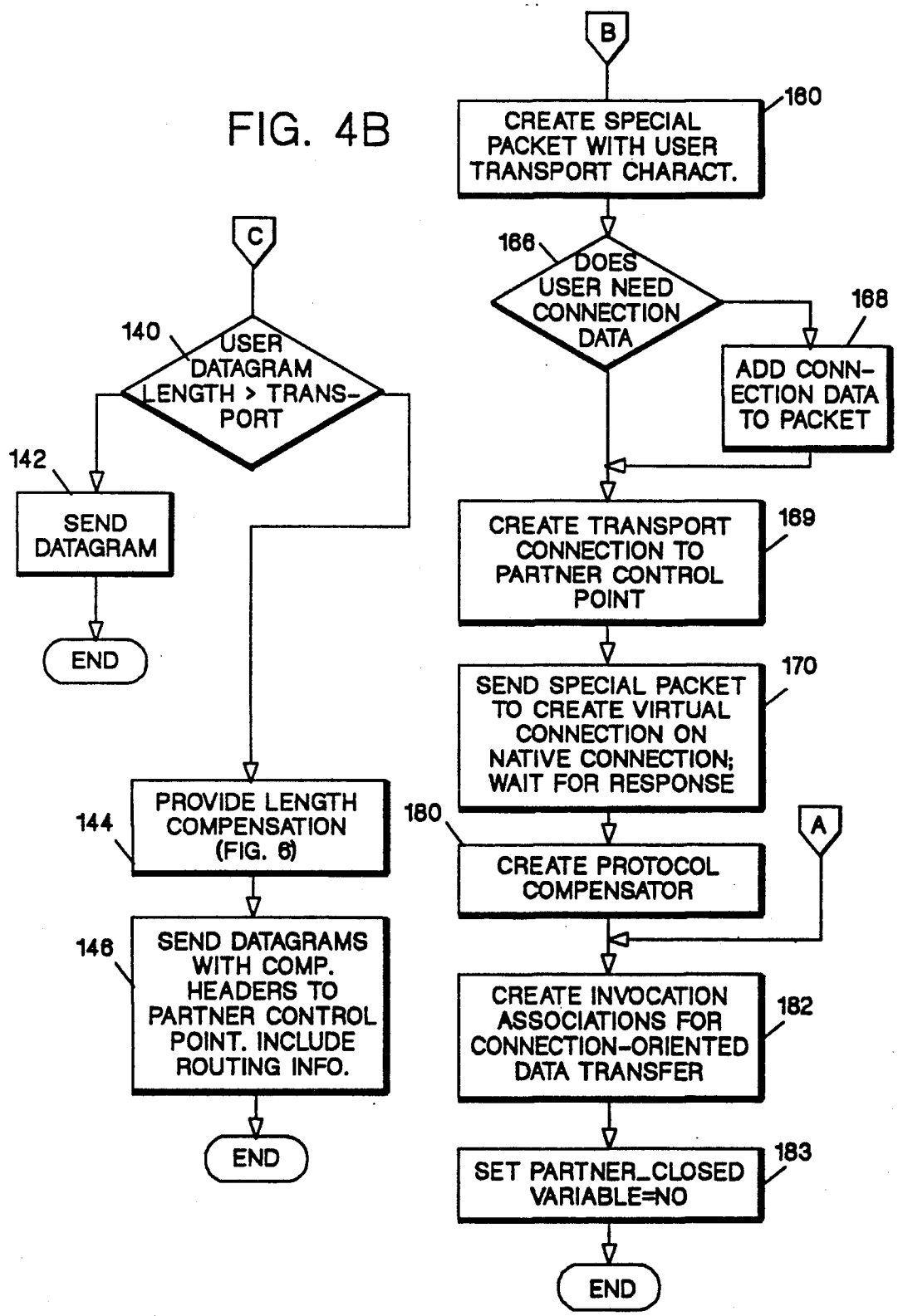

FIG. 4 is a flow chart of logic operations performed at a control point in a node in setting up a connection or in processing datagrams to be sent to a given partner. The previously described process for determining necessary compensations is actually performed as one of the steps of the larger process illustrated in FIG. 4.

When the control point receives an input (operation 116), the input has to be categorized in an operation 118 either as a request from the node transport user or as data from the partner node.

If the received input is partner data, control point receive logic is invoked in operation 120. Details of this logic will be discussed later with reference to FIG. 7.

If the input is a request from the local transport user, a check 124 is made to determine whether the request is one to open a connection with a remote user or application program. If the request is not one to open a connection, a further check 126 is made to see if the request is one to send a datagram to a partner. Assuming a negative result from operation 126, the request is not relevant to the present invention. The request is shown as being processed (operation 128) using processes not significant to this description.

If, however, the request is to send a datagram, the intended destination or partner must be identified (operation 130) and the transport provider previously selected for that partner must be invoked (operation 132).

The length of the datagram to be sent must then be compared in an operation 140 to the maximum datagram length supported by the provider. If the datagram falls within the length limits, it is sent to the partner in an operation 142. If the datagram is too long, length compensation (operation 144) must be provided. Details of the compensation will be discussed later with reference to FIG. 6. The compensation generally requires that the user datagram be separated into two or more shorter datagrams. When the compensation has been performed, the datagrams are sent (operation 146) with the required compensation headers to the control point for the partner transport user.

If the check 124 had shown that the request was one to open a connection to a remote partner, then the partner must be located (operation 148) by the system. A protocol stack or transport provider is then selected (operation 150) from available providers. The selected provider must, of course, be capable of reaching the partner.

Once the local control point selects the transport provider to be used, the transport characteristics of the user and provider are compared (operation 154) using the previously described process. A check 156 is then made to see whether all of the compensation variables are set to No, which means that no compensation is required. If all of the compensation variables are found to have been set to No, a native connection to the partner transport provider is established in operation 158.

If one or more of the compensation variables have Yes values, the local control point creates a special packet (operation 160) including the transport characteristics of the user. A check 166 is then made to determine if the user requires connection data be sent to the partner. If such data is needed, it is added to the special packet in an operation 168.

A transport connection is established (operation 169) to the control point for the partner transport use and the special packet is sent (operation 170) to create a virtual connection on the native connection.

The necessary protocol compensator is created in an operation 180 before creating invocation associations for connection-oriented data transfer in an operation 182.

The same operation 182 is also performed where the prior operations (culminating in operation 152) have established that no compensation (or protocol compensator) is necessary.

A PARTNER_CLOSED variable is initialized to No as the last step in the process of opening a connection.

Figure 5A:
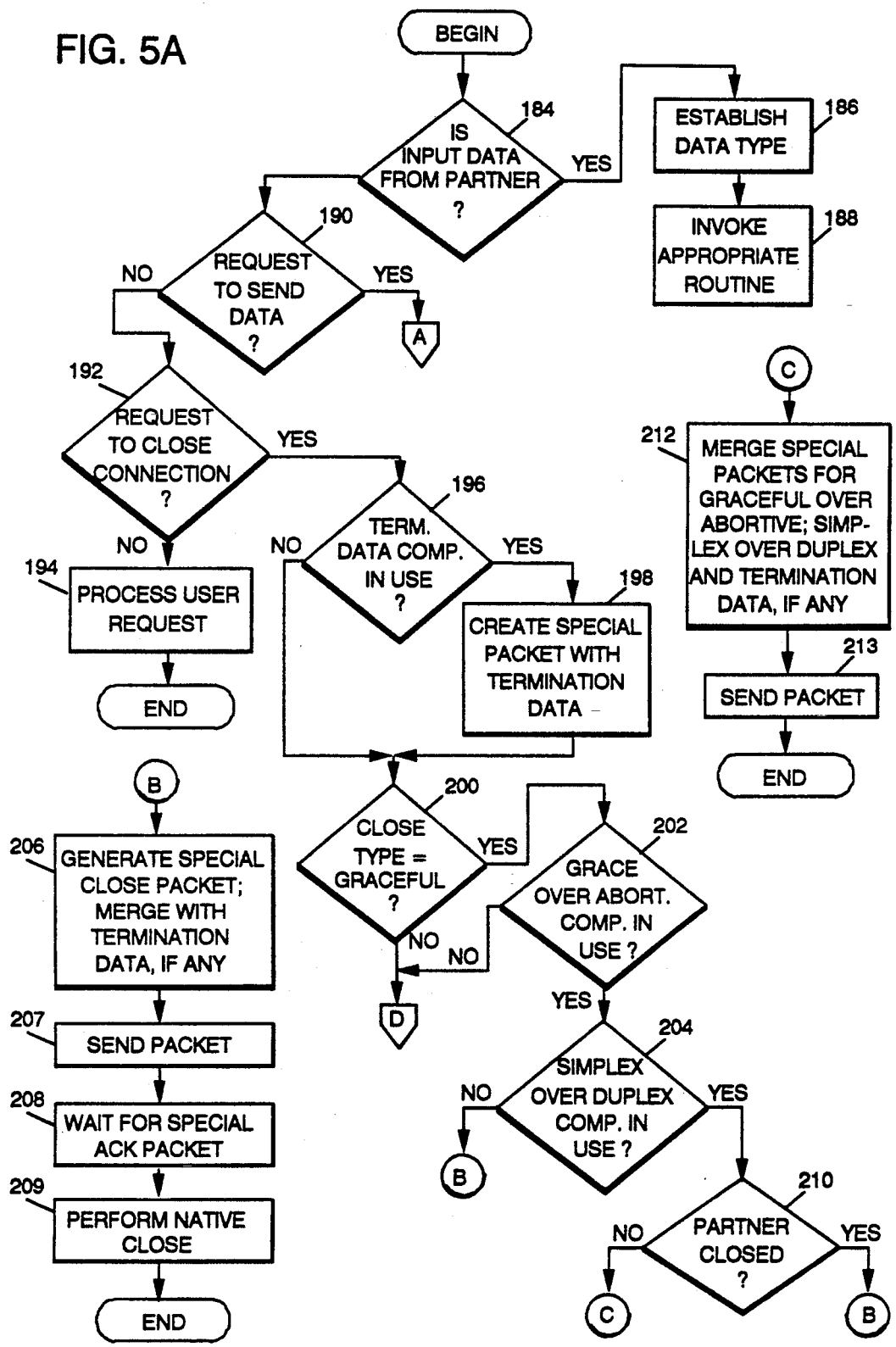
FIG. 5, consisting of FIGS. 5A, 5B and 5C taken together, is a flow chart illustrating the operation of the protocol compensator logic.
Figure 5C:
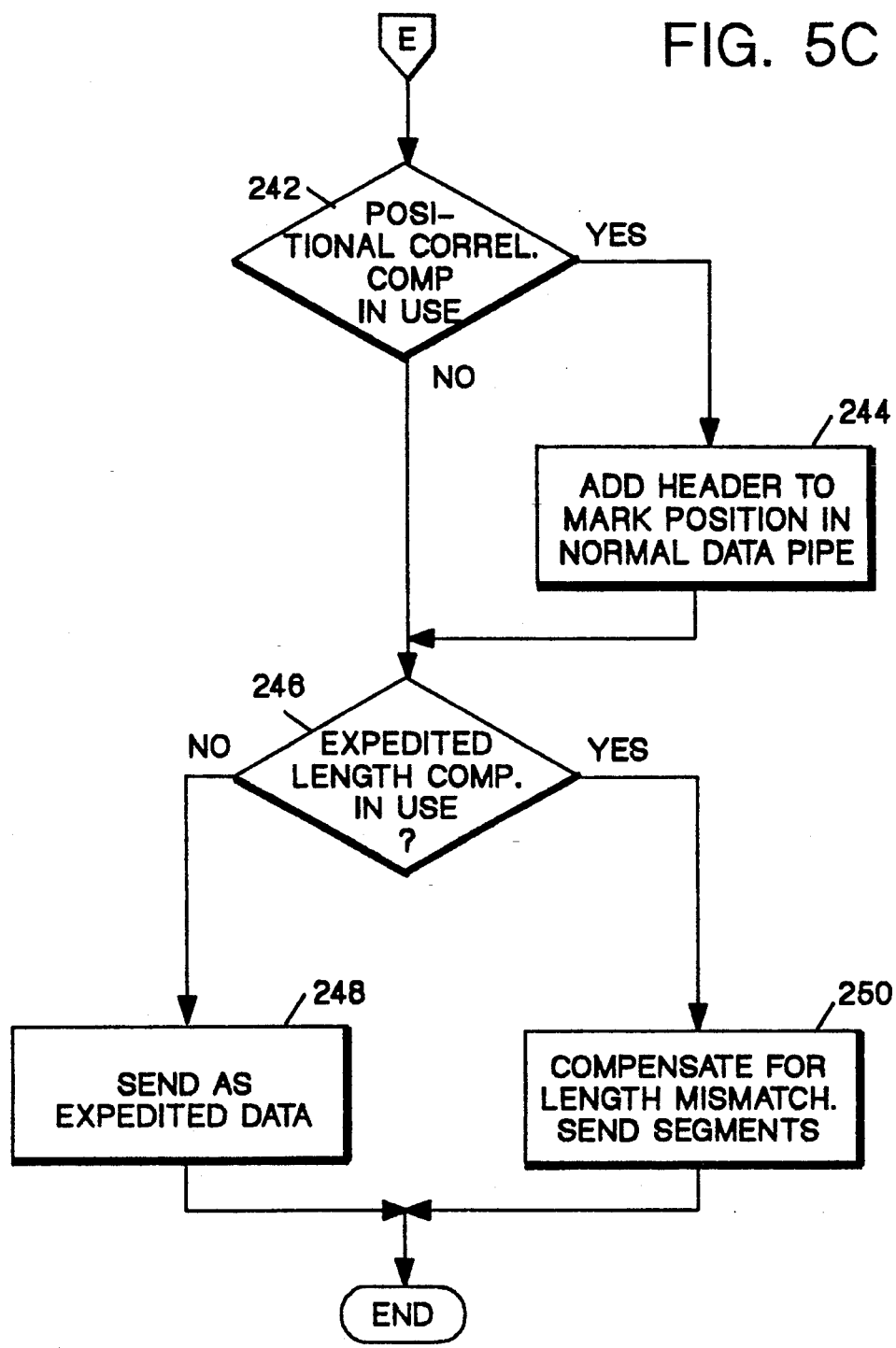

FIG. 5 illustrates operation of the protocol compensator once a connection has been established between two partner application programs. Protocol compensator operation is initiated when a unit of data is received. The control point determines, in an operation 184, whether the data originated locally or with the partner. If the data originated with the partner, the data type is established in an operation 186 and the control point passes control to an appropriate receiving routine in an operation 188.

The processing of received partner data is generally not described in detail, although some of the control point receive logic will be described with reference to a later figure. For the most part, that processing is the inverse of the processing that is performed when the data to be sent to the partner is generated. For example, if the sending node fragments a local user record into shorter records, it is understood that the receiving node must reassemble those records into a single, longer record.

If check 184 indicates that locally-generated data is being received at the control point, a check 190 is made to see whether the data represents a request to send data to the partner node. If the data is not a request to send, a further check 192 is made to see if the request is one to close an open connection to the partner node.

Locally generated data can, of course, be used to trigger functions other than sending data to a partner node or closing an open connection. If the data is to be used to trigger one of these other functions, it is processed. A single block 194 represents such processing although the different processes would actually have to be invoked depending on the details of the data. Since these other processes are not relevant to the operation of the present invention, no descriptions of them will be provided.

If check 192 did indicate that the user request was to close an open connection to the partner node, an operation 196 must determine whether termination data compensation is performed by the protocol compensator. If termination data compensation is to be performed, the compensator adds a special header to the data packet (operation 198) to identify the termination data. As noted earlier, termination data is data that must precede the actual native close operation. For optimization purposes, the termination data packet may be merged with special packets for graceful-over-abortive and simplex-over-duplex close compensations, which are discussed later.

Whether or not a special packet with termination data is created, the close process includes a check 200 as to whether the close type is identified as graceful close.

If a graceful close is found, a check 202 is made to determine whether compensation is required for graceful-over-abortive close. If check 202 shows that such compensation is required, a subsequent check 204 is made to determine whether compensation is to be performed for simplex-over-duplex close situations. Assuming simplex-over-duplex compensation is not required, a special close packet is generated in an operation 206. Any required termination data may be merged into this packet before it is sent in operation 207.

The special close packet consists of the user data plus a special header which indicates that the data in the packet is the last data to be sent. When the partner receives a packet with the special header, it recognizes that it has received all data in transit and responds by sending a special ACK or acknowledgement packet. When the special ACK packet is received by the first node in an operation 208, the first node can be sure that all data in transit has reached the partner and can respond by actually closing the connection at its end in a native close operation 209.

If check 204 shows that simplex over duplex compensation is required, a check 210 is made to see if the partner's end of the connection is already closed. If it is, the series of operations beginning with operation 206 is performed.

If simplex over duplex compensation is not in use, special packets required for graceful-over-abortive close and simplex-over-duplex close operations are merged in an operation 212 with any termination data that must be sent. This special packet is then sent in operation 213.

If check 200 shows that the close type is not graceful close or if check 202 indicates that graceful-over-abortive compensation is not required, then a check 214 is made as to whether a simplex close is called for. A negative response means that the user requires a duplex close. The local user will check for any unsent termination data packets in an operation 215 and send those packets (operation 217) before performing a native close (operation 218) that will result in both ends of the connection being closed. This path includes both the duplex-over-simplex and the abortive-over-graceful close situations. Abortive-over-graceful close does not require compensation while duplex-over-simplex close requires compensating action only on the receiving side. When the protocol compensator receives a simplex close for the partner and duplex-over-simplex compensation is required, it immediately performs a simplex close.

If check 214 shows a simplex close is required, then a check 216 is made to determine whether simplex-over-duplex compensation is required; that is, whether the providers support only duplex close. If no such compensation is required, meaning the providers support simplex close, then operation 218 is performed to close the local end of the connection after any pending termination data packets are sent by means of operations 215 and 217.

If check 216 shows that simplex-over-duplex compensation is required, then a check 220 is made to see if the partner is already closed. If the partner is already closed, then a native close of the local connection (operation 218) can be performed.

If the partner is not closed when check 220 is made, a special close packet for providing simplex-over-duplex close compensation is generated in an operation 222. Termination data to be sent, if any can be merged into this packet before it is sent in operation 223.

The receiving partner responds to the special packet by setting a PARTNER_CLOSED variable to Yes, but does not actually close the connection. When the partner transport user issues its own simplex close instruction, the protocol compensator checks to see if the PARTNER_CLOSE variable is Yes. If so, it issues a duplex close instruction to close both ends of the connection.

If the check 190 performed early in the process shows that the user request is one to send data to the partner, then the data is analyzed in operation 224 to determine whether it represents expedited (rather than normal) data. If the data is expedited data, a further check 236 is made to determine whether expedited data compensation is in use; that is, whether the provider supports expedited data. If such compensation is in use (the provider does not support sending of expedited data in a separate data flow), a special header is added to the data packet in operation 238. The special header identifies the data as being expedited data and defines the length of the expedited data. The expedited data is then processed and sent as normal data in an operation 240. At the receiving end, the compensator strips the special header and performs appropriate processing for expedited data.

No further compensation is required when expedited data is sent in the normal data stream. The length of the expedited data is defined in its header and the position of the expedited data relative to the normal data stream is implicit. Typical compensations associated with normal data need not be performed. Record boundaries can be inferred from the length values in the headers. Also, it is extremely unlikely that the length of expedited data will ever exceed the maximum record length support by providers. That makes it unnecessary to consider record length compensation.

If check 236 shows that expedited data compensation is not required (the provider supports a separate flow of expedited data), a further check 242 is made to determine whether positional correlation compensation is in use. Such correlation is provided by an operation 244 which generates a special header containing a current pointer to the normal data stream.

If an operation 246 indicates that it may be necessary to provide compensation for overly-long units of expedited data (including any special headers), then the length of the current unit of data (including its special headers) is checked against the provider-supported maximum length for expedited data records. Note, in this case, that the comparison is needed since the system may have a relatively short maximum length for expedited data. If the current unit (with its headers) is too long, a compensation operation 250 is performed. As noted earlier, length compensation generally requires that the data packet to be sent be broken down into several shorter packets.

If operation 246 indicates that length compensation is not required, the expedited data packet (and its headers) are sent in a single unit (operation 248) in the expedited data flow.

Fewer compensations are required for normal data than for expedited data. If check 224 shows that the data is normal data (which as already noted can include expedited data sent in the normal data flow with special headers), then a check 226 is made to determine whether record boundaries must be preserved even when data is to be transported to the partner using a stream-oriented transport provider. If check 226 shows that record boundary compensation is required, a special header is added (operation 228) to identify the beginning of the record and its length. The special header enables the record to be reassembled at the partner even though transported using a stream-oriented protocol.

Whether or not record boundary compensation is required, a check 230 is made to determine whether record length compensation is to be performed. If no such compensation is necessary, the data is sent to the partner as normal data (operation 232).

If record length compensation is required, the record is broken down or fragmented into shorter records in an operation 234. The partner reassembles the original record from the fragments.

Figure 6:
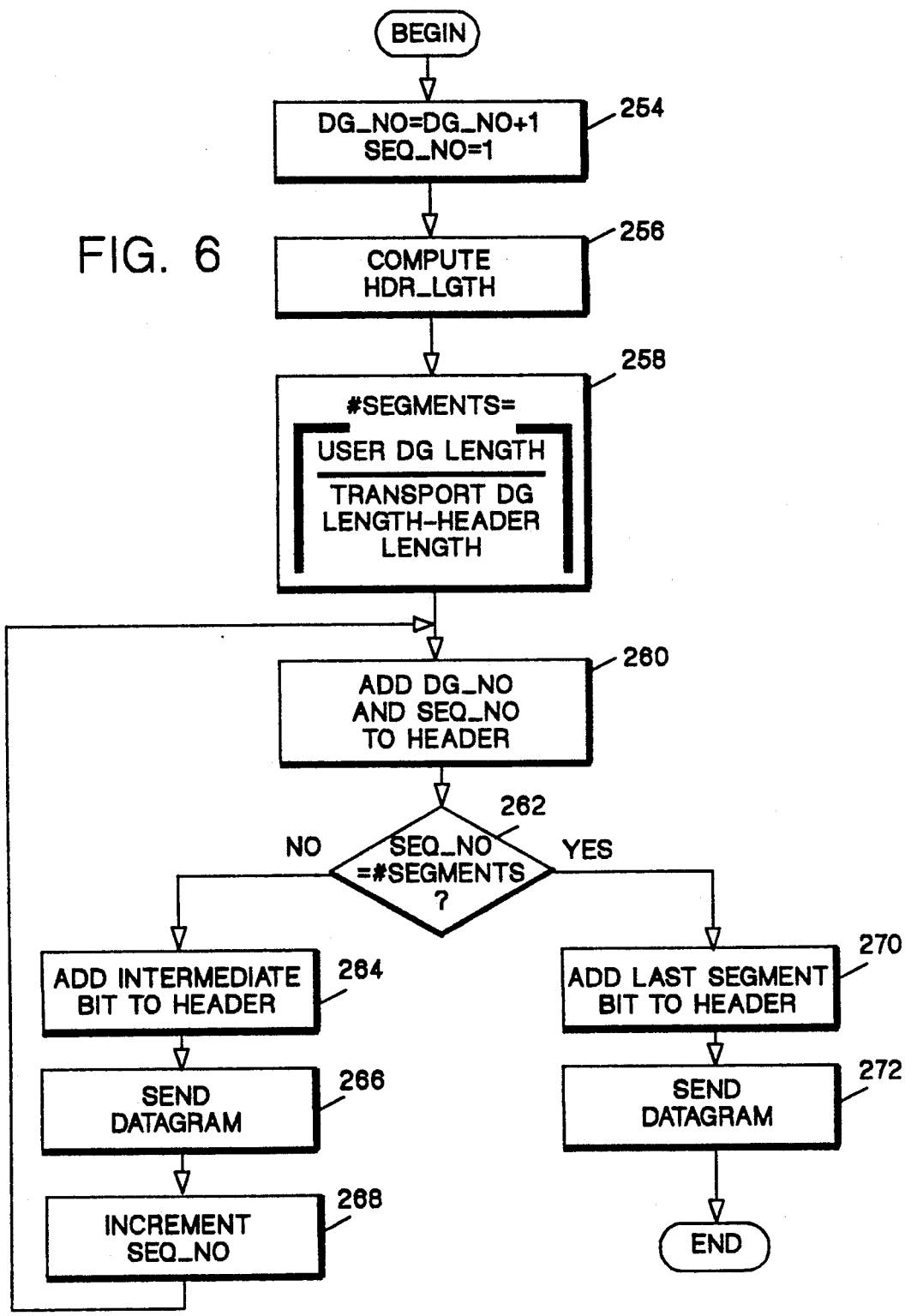
FIG. 6 is a flow chart describing specific compensations performed where a transport provider does not support datagrams as long as those which a transport user wishes to send.

FIG. 6 is a flow chart of operations which must be performed to compensate for length mismatches for datagrams; that is, situations where the user assumes it can send datagrams longer than those supported by the transport provider.

Each instance of length mismatch compensation begins with an operation 254 in which a unique datagram number (DG_NO) be assigned to each datagram to be fragmented. The sequence number (SEQ_NO) or number to be assigned to each fragmented segment of an original datagram is initialized to 1.

The length of the header which must accompany each segment is calculated in operation 256. Header length is needed since it helps determine into how many segments the user datagram must be fragmented. The number of segments (calculated in an operation 258) depends on the length of the user datagram relative to the length of that portion of each transport datagram that can actually be used for transporting fragments of user data. Not all of the transport datagram length can be dedicated to user data as some must be reserved for the header. Operation 258 contains a special mathematics "ceiling" symbol which indicates the results of the indicated division are to be rounded up to the next higher integer.

Once the number of segments needed has been calculated, a first segment is taken from the user datagram by reading the maximum number of user data bits than can be transmitted in the current segment. The assigned datagram number and sequence number are added to the header for the segment in operation 260 and a check 262 is made to determine whether the assigned sequence number equals the number of required segments. Equality means that the current segment is the last segment to be sent.

Assuming check 262 shows this is not the last segment, a bit is added to the header in operation 264 to indicate this is only an intermediate segment. The datagram is sent (operation 266) and the sequence number is incremented (operation 268) before the next nibble is taken from the user datagram.

If check 262 shows that the current segment is the last segment that must be generated, a "last segment" bit is added to the header in operation 270 before the datagram is sent in operation 272.

FIG. 7 is a flow chart of the operations that are performed at a control point for a partner node when a datagram or special connection packet arrives. A check 274 is made to determine whether the data is a datagram or a special connection packet. Assuming the data is identified as a datagram, the packet header is checked (operation 278) to determine whether segmentation is indicated; that is whether the datagram is just one segment of a longer datagram originating with another user.

If the datagram is a segment of a longer user datagram, it is stored in operation 279 in a storage location dedicated to segments of the same datagram. A check 280 is made to determine whether it is the last segment for a particular datagram. Even if the segment may only be an intermediate segment, it is still possible that the last segment for the datagram has already been received out of order. This is checked in operation 281.

If the header identifies the segment is the last segment of a particular datagram or if the last segment and at least one intermediate segment have been received, a check 284 is made to determine whether all intermediate segments of that datagram have been received. If intermediate segments remain to be received, the process is exited while the system waits for additional segments.

If, however, all segments of a particular datagram have been received, the user datagram is reassembled in an operation 288, which is basically the inverse of the segmentation process described with reference to FIG. 6. Since the segments may not be received in the same order in which they were sent, it may be necessary to sort and rearrange the segments using the SEQ_NO assigned to each segment.

The name of the destination application program is extracted from the reassembled packet (operation 290) and the packet is routed to the application in an operation 292.

If operation 274 identifies the received packet as a special connection packet, that packet is used to support a comparison (operation 300) of the first or remote user's transport characteristics (received in the packet) with the second or local user's transport characteristics.

The comparison operation culminates with a check 302 as to whether the user transport characteristics are a complete match. Any mismatch may indicate that the two application programs at opposite ends of the connection cannot successfully communicate with each other. The control point responds to a mismatch by notifying the control point for the remote user in an operation 304.

Assuming the user transport characteristics do match, the control point performs its own comparison (operation 306) of the transport characteristics of the local transport user and local transport provider, using the process discussed with reference to FIG. 3.

The protocol compensator resulting from this operation is created in an operation 308 and the control point creates the invocation associations required for connection-oriented data transfer in operation 310. Finally, the control point initializes the PARTNER_CLOSED variable to No in an operation 312.

While a preferred embodiment of the invention has been described, it is intended that the appended claims shall be construed to include not only the preferred embodiment but also all such variations and modifications as fall within the true spirit and scope of the invention.

We claim:

1. A method of establishing a transport-level connection across a network between a first transport user and a second transport user, each of said users being served by its own transport provider at an interface to the network, said method comprising the steps of:
    establishing a first set of transport functions consisting of those transport functions required by the first transport user;
    establishing a second set of transport functions consisting of those functions supported by the transport provider for said first transport user;
    comparing each function in the first set with the corresponding function in the second set to determine whether the required function matches the corresponding supported function; and compensating for at least one mismatch between a user-required transport function and the corresponding provider-supported function as that function is being performed by adding control data to the data being passed through the network from the transport provider for the first transport user to the transport provider for the second transport user.

2. A method as defined in claim 1 wherein the control data added in the compensating step comprises compensatory headers.

3. A method of establishing a transport-level connection across a network between a first transport user and a second transport user, said method comprising the steps of:
selecting a transport provider for said first transport user from one of a set of available transport providers;
establishing a first set of transport functions required by the first transport user;
establishing a second set of transport functions supported by the selected transport provider;
comparing each function in the first set with the corresponding function in the second set to determine whether the required function matches the corresponding supported function; and
compensating for at least one mismatch between a user-required transport function and the corresponding provided-supported transport function during execution of the required function by the transport user by adding control data to data to be passed through the network from the first transport user to the second transport user.

4. A method as defined in claim 3 wherein a second transport provider matching the first transport provider is provided for the second transport user and wherein said second transport provider strips the control data from user data before it is delivered to the second transport user.

5. A method of establishing a transport-layer connection between a first application program at a first node in a computer network and a second application program at a second node in the network to permit data to be transported from the first application program through the network to the second application program independent of an application programming interface to which the first application program is written and of network transport protocols, said method comprising the steps of:
establishing a first set of transport functions required by the application programming interface of the first application program;
mapping the transport functions in said first set to a second, standard set of transport layer protocol boundary functions;
establishing a third set of transport functions supported by the network transport protocols;
comparing corresponding functions in the second and third sets to determine whether corresponding functions match each other; and
altering the data transferred from the first node to the second node to compensate for at least one of any mismatches found as a result of the comparison.

6. A method as defined in claim 5 wherein the step of altering the data comprises the specific step of adding a compensatory header to data supplied by the first application program.

7. A system for providing a transport-level connection across a network between a first transport user and a second transport user, each of said users being served by its own transport provider at the user's interface to the network, said system comprising:
means for establishing a first set of transport functions consisting of transport functions required by the first transport user;
means for establishing a second set of transport functions consisting of functions supported by the transport provider for said first transport user;
means for comparing each function in the first set with the corresponding function in the second set to determine whether each user-required function matches a corresponding provider-supported function; and
means for introducing compensation into a stream of data to be sent through the network to compensate for at least one mismatch of any found between a user-required function and a provider-supported function.

8. A system as defined in claim 7 wherein said compensation-introducing means comprises means for adding compensating header to user data.

9. A system for providing a transport-level connection across a network between a first transport user and a second transport user, said system comprising:
means for selecting a transport provider for said first transport user from one of a set of available transport providers;
means for establishing a first set of transport functions required by the first transport user;
means for establishing a second set of transport functions supported by the selected transport provider;
means for comparing each function in the first set with a corresponding function in the second set to determine whether the user-required function matches a corresponding provider-supported function; and
means responsive to mismatches between user-required functions and corresponding provider-supported functions to compensate for at least one such mismatch during execution of the required function by the transport user by adding control data to user data to be passed through the network from the first transport user to the second transport user.

10. A system as defined in claim 9 further including a second transport provider matching the first transport provider, said second transport provider including means for removing the control data from the user data before it is delivered to the second transport user.

11. A system for providing a transport-layer connection between a first application program at a first node in a computer network and a second application program at a second node in the network to permit data to be transported from the first application program through the network even where an application programming interface to which the first application program is written uses protocols different from network transport protocols, said system comprising:
means for establishing a first set of transport functions required by the application programming interface of the first application program;
means for mapping the transport functions in said first set to a second, standard set of transport layer protocol boundary functions;

means for establishing a third set of transport functions supported by the network transport protocols;

means for comparing corresponding functions in the second and third sets to determined whether corresponding functions match each other; and means for altering data transferred from the first node to the second node to compensate for any mismatches found as a result of the comparison.

12. A system as defined in claim 11 wherein said means for altering data comprises means for adding compensatory headers to data supplied by the first application program.

* * * * *